United States Patent
Beddok et al.

(10) Patent No.: US 12,381,506 B2
(45) Date of Patent: Aug. 5, 2025

(54) DEVICE FOR CONTROLLING A LEAST ONE ELECTRIC MOTOR FOR AN AIRCRAFT-PROPELLING ASSEMBLY

(71) Applicants: SAFRAN HELICOPTER ENGINES, Bordes (FR); SAFRAN ELECTRICAL & POWER, Blagnac (FR)

(72) Inventors: Stéphane Meyer Beddok, Moissy-Cramayel (FR); David Bernard Martin Lemay, Moissy-Cramayel (FR); Julien Marc Nicolas Rambaud, Moissy-Cramayel (FR)

(73) Assignees: SAFRAN HELICOPTER ENGINES, Bordes (FR); Safran Electrical & Power, Blagnac (FR)

( * ) Notice: Subject to any disclaimer, the term of this patent is extended or adjusted under 35 U.S.C. 154(b) by 161 days.

(21) Appl. No.: 18/285,667

(22) PCT Filed: Apr. 5, 2022

(86) PCT No.: PCT/FR2022/050630
§ 371 (c)(1),
(2) Date: Oct. 5, 2023

(87) PCT Pub. No.: WO2022/214761
PCT Pub. Date: Oct. 13, 2022

(65) Prior Publication Data
US 2024/0186935 A1  Jun. 6, 2024

(30) Foreign Application Priority Data
Apr. 9, 2021  (FR) ...................... 2103668

(51) Int. Cl.
*H02P 29/10* (2016.01)
*B64C 11/30* (2006.01)
*B64D 27/34* (2024.01)

(52) U.S. Cl.
CPC ............ *H02P 29/10* (2016.02); *B64C 11/305* (2013.01); *B64D 27/34* (2024.01)

(58) Field of Classification Search
CPC .......... H02P 27/00; H02P 27/04; H02P 27/06; H02P 27/08; H02P 2101/30;
(Continued)

(56) References Cited

U.S. PATENT DOCUMENTS 11,128,251 B1 * 9/2021 Solodovnik ............ B64D 27/34
2016/0340051 A1  11/2016 Edwards et al.
2021/0039796 A1  2/2021 Hirabayashi et al.

FOREIGN PATENT DOCUMENTS

WO  2020/115416 A1  6/2020

OTHER PUBLICATIONS

International Search Report issued Aug. 11, 2022 in French Application No. PCT/FR2022/050630.
(Continued)

*Primary Examiner* — Antony M Paul
(74) *Attorney, Agent, or Firm* — Sughrue Mion, PLLC

(57) ABSTRACT

The present invention relates to a device (1) for controlling an electric aircraft-propelling assembly, said propelling assembly comprising a propeller (3) and at least one electric motor (4) that is powered by an electric supply voltage and that delivers a torque and a rotation speed to drive the propeller (3). The control device (1) comprises at least a unit (11) for measuring an electric supply voltage, and a control unit (12) suitable for making a signal delivered to the electric motor vary as a function of said electric supply voltage, with a view to making the rotation speed of the propeller vary.

13 Claims, 3 Drawing Sheets

(58) Field of Classification Search
CPC ........... H02P 2207/05; H02P 2207/076; H02P 2201/01; H02P 29/024; H02P 29/0241; H02P 29/032; H02P 29/40; H02P 25/022; H02P 25/062; H02P 23/28; H02P 21/00; H02P 21/0021; H02P 21/04; H02P 21/18; H02P 21/20; H02P 21/22; H02P 21/14; H02P 23/07; H02P 23/14; H02P 23/18; H02P 9/305; H02P 9/44; H02P 6/04; H02P 6/08; H02P 6/12; H02P 6/28; H02P 6/17; H02P 1/30; H02P 29/028; H02P 21/0089; H02P 3/18; H02P 5/74; H02P 29/10; B64D 2221/00; B64D 27/34; B64D 27/357; B64D 45/00; B64D 2045/0085; B64D 27/33; B64D 27/355; B64D 35/026; B64C 11/001; B64C 11/44; B64C 29/0025; B64C 29/0033; B64C 11/303; B64C 11/325; B64C 27/32; B64C 13/0421; B64C 13/50; B64C 11/30; B64C 27/08; B60L 2200/10; B60L 3/04; B60L 50/60; B60L 2220/42; B60L 3/003; B60L 15/025; B60L 15/06; B60L 2210/40; B60L 2240/423; B60L 3/0046; B60L 58/40; H02H 7/122; H02H 7/0833; H02H 1/0007; G01R 31/008

See application file for complete search history.

(56) References Cited

OTHER PUBLICATIONS

French Preliminary Report issued Nov. 26, 2021 in Application No. FR 2103668.

\* cited by examiner

DEVICE FOR CONTROLLING A LEAST ONE ELECTRIC MOTOR FOR AN AIRCRAFT-PROPELLING ASSEMBLY

CROSS REFERENCE TO RELATED APPLICATIONS

This application is a National Stage of International Application No. PCT/FR2022/050630 filed Apr. 5, 2022, which is based on and claims priority to French Patent Application No. 2103668 filed Apr. 9, 2021, the contents of each of which being herein incorporated by reference in their entireties.

FIELD OF THE INVENTION

The present invention relates to the field of aircrafts propelled by one or more electric motors driving at least one propeller or one bladed rotor.

STATE OF THE ART

In what follows, it is meant by "electric thruster of an aircraft" an assembly formed by at least one propeller or one bladed rotor and at least one electric motor for their driving. Generally, an electric motor is powered by a battery or a generator. The battery or the generator provides the motor with electric supply voltage and current. This electric voltage and this current make it possible to run the motor and convert the electrical energy into mechanical energy. Two quantities make it possible to quantify the mechanical energy produced: the torque and the speed of rotation of the rotor of the motor.

In particular in the case of a battery power—but this is also true for a generator—the supply voltage provided can vary. More specifically, as the battery discharges, the supply voltage decreases. Thus, in the case of an electric thruster of an aircraft, in the absence of monitoring, when the voltage of the battery falls below a determined threshold, the speed of rotation of the motor of the electric thruster can no longer be maintained which causes a drop in the mechanical power produced by the electric thruster. This may result in a loss of thrust and therefore a stall of the aircraft. In other words, when the voltage of the battery falls below a certain threshold, the torque level provided by the electric motor, at a given speed, decreases.

It is therefore essential to monitor the electric power provided to the electric motor of an electric thruster.

Furthermore, it is well known that an electric machine produces a voltage called electromotive force (EMF) voltage when it is speed-driven. This voltage is proportional to the speed of rotation. In the case of an operation of the electric machine as a motor, this EMF is also produced but opposes the supply current of the motor. It is then called "counter-electromotive force" (CEMF).

To operate in motor mode, that is to say with a driving torque, the electric machine must be supplied by a voltage higher than the CEMF of the motor.

Most supply sources (battery, generator, fuel cell, etc.) have variable supply voltages and when in some life situations the supply voltage of the electric motor is too low (that is to say lower than the CEMF of the motor), the motor must then limit either its torque or its speed of rotation. In the case of an electric thruster of an aircraft, these limitations can generate operational concerns such as losses of lift or thrust of a propeller or a rotor, with an impact on the monitoring of the aircraft.

This problem is accentuated when several motors, each powered by a different voltage source, are used to drive the same propeller or the same rotor. In this case, the motors must operate at the same speed. However, the speed is imposed by the motor with the highest supply voltage, while the CEMF remains fixed for each motor. In this case, the ability to provide a torque is directly related to the difference between the supply voltage and the CEMF. If this difference vanishes, the torque is zero and the motor no longer provides mechanical power. In practice, the existing monitoring solutions prevent the torque from becoming negative, but on the other hand do not prevent the elimination of the torque.

The motor with the lowest supply voltage will no longer be able to follow the speed imposed by the other motor(s). If nothing is done, it will then suddenly stall, no longer providing any power to the propeller or the rotor. The other motor (s) will then have to provide all the power required by the thruster on their own.

Furthermore, the supply voltage can also vary depending on other parameters, such as the aging of a battery or its temperature. On the other hand, during the driving of a propeller or a rotor by at least one electric motor, the power to be provided is the product of the speed of rotation by the torque developed by the propeller or the rotor. The torque being a function of the speed squared, the increase in speed is therefore also reflected in an increase in the power consumed according to the speed cubed and therefore in an accentuation of the battery discharge phenomenon.

Referring to FIG. 1, an electric motor is generally characterized by its torque-speed plane. This plane describes the torque domain that the motor is capable of providing as a function of its speed of rotation. For a self-piloted permanent magnet synchronous motor, this domain is generally characterized by:

a first segment I covering a fairly wide speed range where the torque deliverable by the motor is constant. This maximum torque can however be limited in time due to thermal problems of the motor or its power electronics.
 a second segment II where the torque that this motor can provide decreases very rapidly with the speed of rotation. In the absence of defluxing, this curve is generally very steep, which means that for a very small speed variation, the achievable torque varies within very large amplitude. It is therefore an operating area in which it is generally not wished to operate.
 the intersection of these two segments constitutes a break point III which depends on the design characteristics of the motor and directly on its supply voltage. Thus, if the supply voltage declines, the break point moves proportionally to the left and the decreasing curve is then translated in the same direction.

Currently, to overcome the decline in the electric supply voltage of the motor (s) below the electromotive force of the motor, two main solutions are known:

cutting off the motor control below a voltage level close to its electromotive force, or
 defluxing the electric motor.

The defluxing consists of reducing the magnetic flux in the air gap. This solution is simple to implement on a wound-rotor synchronous electric motor because the excitation can be easily monitored by the rotor current. In the case of the use of permanent magnet synchronous machines (PMSM) preferred in the aeronautical field because they are lighter and have better efficiency, the defluxing is delicate due to the presence of magnets in the rotor.

A known defluxing solution nevertheless consists in phase shifting the stator magnetic field by acting on the control of the motor phase currents. This action makes it possible to "fight" the rotor field and thus to artificially lower the electromotive force of the motor. The main drawback of this solution is that it involves the control of an additional electric current component in the motor phases. This additional so-called "direct" current generates strong heating of the motor winding and of the associated power electronics and does not participate in the torque creation. The efficiency is therefore degraded with greater electric power consumption on the network for the same mechanical operating point.

In the case of an aeronautical application, the defluxing makes it possible to maintain the speed of rotation of the motor despite a supply voltage lower than the CEMF of the motor. With a variable-pitch propeller, the defluxing is used to maintain the speed of the propeller, but the torque that the motor can provide decreases with the defluxing (which involves a decrease in the magnetic flux) and it is then necessary to act on the pitch to adapt the resistive torque of the propeller to the torque provided by the motor. This decrease in the torque delivered to the propeller has the disadvantage of lowering the induced thrust, with risks for the controllability of the aircraft.

In this context, it is necessary to provide a monitoring device making it possible to optimize the speed of rotation of an electric motor as a function of a provided supply voltage.

To allow this optimization of the speed of rotation of the electric motor (s) in the case of an electric thruster comprising a propeller (or a rotor) driven by at least one electric motor, the present invention aims to modulate the speed of rotation of the propeller as a function of the minimum supply voltage applied to a motor or to all the motors that drive it.

DISCLOSURE OF THE INVENTION

According to a first aspect, the invention proposes a device for monitoring an electric thruster for an aircraft, said thruster comprising a propeller and at least one electric motor supplied by an electric supply voltage and delivering a torque and a speed of rotation to drive the propeller. In addition, the monitoring device comprises at least one member for measuring an electric supply voltage, and a monitoring member adapted to vary a signal provided to the electric motor as a function of said electric supply voltage, to vary the speed of rotation of the propeller.

The monitoring member can comprise an inverter connected to the electric motor, the inverter being adapted to receive the electric supply voltage and deliver the signal provided to the electric motor as a function of said electric supply voltage.

The inverter can vary a frequency of the signal provided to the electric motor.

The propeller can have a variable pitch and the monitoring member can be adapted to vary a signal provided to a device for controlling the pitch of the propeller as a function of said electric supply voltage, in order to vary the pitch of the propeller.

Said at least one measuring member can be adapted to measure the electric supply voltage at the terminals of at least one battery powering said at least one motor.

According to a second aspect, the invention relates to an electric thruster comprising a propeller driven by at least one electric motor and a monitoring device according to the invention.

The electric thruster can comprise a plurality of electric motors whose stators are mounted in series on a same shaft so as to sum their torques, each stator being connected to an electric source via a dedicated inverter.

The electric thruster can comprise a plurality of electric motors mechanically connected in parallel via a same gear train so as to sum their torques, the gear train being shaped so that the motors operate at the same speed.

A propeller can be driven by a plurality of electric motors, each electric motor being supplied by an electric supply voltage distinct from that of another electric motor, the monitoring device comprising for each electric supply voltage a dedicated measuring member.

According to another aspect, the invention relates to a method for monitoring the speed of a propeller driven by at least one electric motor, using a monitoring device according to the invention. The method comprises at least the following steps:
(a) acquiring at least one supply voltage from at least one motor;
(b) modifying a speed of rotation of the propeller as a function of the acquired supply voltage in order to maintain a substantially constant torque and a thrust greater than or equal to a predetermined minimum thrust.

Step (a) can comprise the following sub-steps:
(a1) acquiring several supply voltages, each supply voltage being dedicated to a distinct motor;
(a2) identifying the lowest acquired supply voltage, and wherein in step (b), the acquired supply voltage used is the lowest acquired supply voltage identified in step (a2).

Step (b) can further comprise a modification of a pitch of the propeller as a function of the supply voltage acquired in order to maintain a substantially constant torque delivered by the propeller and a thrust greater than or equal to the predetermined minimum thrust.

According to another aspect, the invention relates to an aircraft comprising a propeller driven by at least one electric motor and a monitoring device according to the invention.

DESCRIPTION OF THE FIGURES

Other characteristics, aims and advantages of the invention will emerge from the following description which is purely illustrative and not limiting and which should be read in relation to the appended drawing in which.

DETAILED DESCRIPTION OF THE INVENTION

General Architecture

Figure 2:
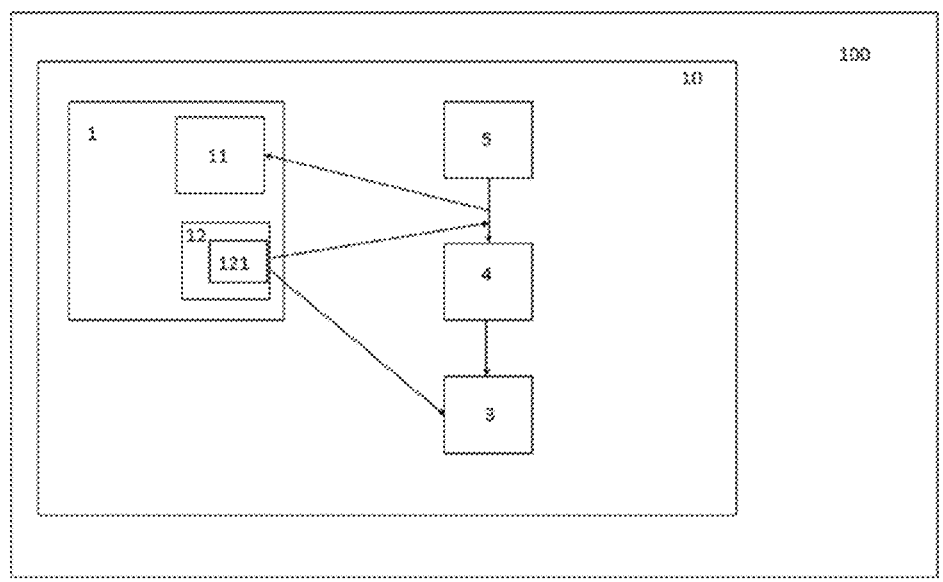
FIG. 2 is a block diagram of an electric thruster comprising a monitoring device according to the invention.

According to a first aspect, as schematized in FIG. 2, the invention proposes a device 1 for monitoring the speed of a propeller 3 driven by at least one electric motor 4 of an aircraft 100. Typically (by way of example non-limiting example), the motor (s) 4 is powered by a battery 5.

Alternatively or in addition to the batteries, the electric supply voltage can also be provided by electric generators and/or fuel cells.

Electric Thruster

The monitoring device 1 according to the invention is designed to be integrated into an electric thruster 10, itself object of the invention.

Typically, the electric thruster 10 comprises at least one propeller 3 driven in rotation by one or more electric motors 4. Indeed, it is possible for a single electric motor 4 to drive the propeller 3, or for several electric motors 4 to drive the same propeller 3. The or each electric motor 4 is supplied with electric energy in the form of an electrical signal and provides mechanical energy. More specifically, each electric motor 4 is supplied by two electrical quantities, a voltage and an intensity, and delivers two mechanical quantities, a speed of rotation and a torque. It is known that, schematically, a variation in the frequency of the voltage signal at the input varies the speed at the output, and similarly a variation in the intensity of the current at the input varies the torque at the output.

Figure 3:
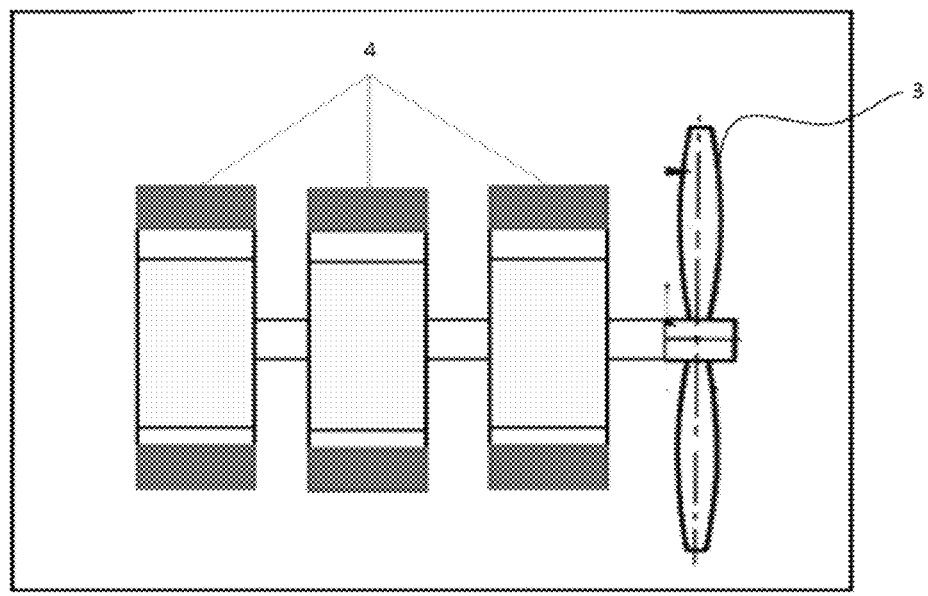
FIG. 3 is a schematic representation of an electric thruster comprising several electric motors in series.

In the case where several motors 4 drive the same propeller, two main architectures can be distinguished. Referring to FIG. 3, it is possible to have several electric motors 4 whose stators are mounted in series on the same shaft so as to sum their torques, and which drive in rotation a single propeller 3. Each stator can be connected to an electric source via a dedicated inverter, the electric source of a stator being able to be different from that of the neighboring stator.

Figure 4:
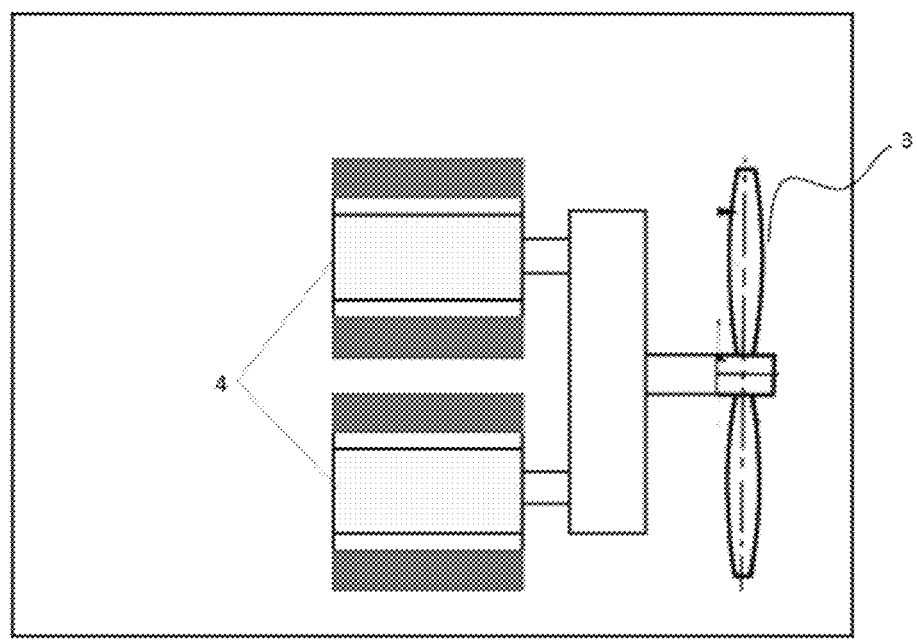
FIG. 4 is a schematic representation of an electric thruster comprising several electric shunt motors.

According to another arrangement, with reference to FIG. 4, it is possible to have several motors 4 mechanically connected in parallel, in this case each electric motor 4 has its own stator and its own rotor. A gear train makes it possible to combine the rotation of the different electric motors.

According to these two embodiments, the electric motors 4 all have the same speed of rotation, imposed by the rotor or a gear train to which they are connected but each provide a distinct torque. The torque provided to the propeller 3 is the sum of all the torques provided by the electric motors 4.

Furthermore, as schematized in FIG. 2, the electric thruster 10 can comprise one or more batteries 5 (or another electric supply source) to power the electric motor (s) 4. It is possible for example to have a configuration in which a battery 5 powers a plurality of electric motors 4, or another configuration in which each electric motor is connected to a distinct battery.

Monitoring Device

The monitoring device 1 can in particular comprise a member 11 for measuring an electric voltage provided to the motor 4, and a monitoring member 12 adapted to vary the speed of rotation of the motor, and therefore of the propeller, independently of the electric voltage provided to the motor.

In addition, in a particularly advantageous manner, the variation in the speed of rotation of the propeller 3 makes it possible to maintain a substantially constant torque of the propeller 3, for example by acting jointly on a control of the pitch of the propeller (or the pitch of the rotor blades).

In other words, the monitoring device 1 measures the electric supply voltage, and consequently varies a signal transmitted to the motor to vary the speed. In other words, the invention makes it possible to adapt the speed of rotation of the electric motor 4 to take into account a possible decline in the supply voltage and avoid a drop in the mechanical power provided by the motor. Thus, in the case of a known system, without monitoring member 12, the supply voltage provided by a battery decreases as the battery empties. It follows that in this type of known systems, the speed of the electric motor also decreases since it is linked to a frequency emitted by an inverter as a function of the supply voltage.

Figure 1:
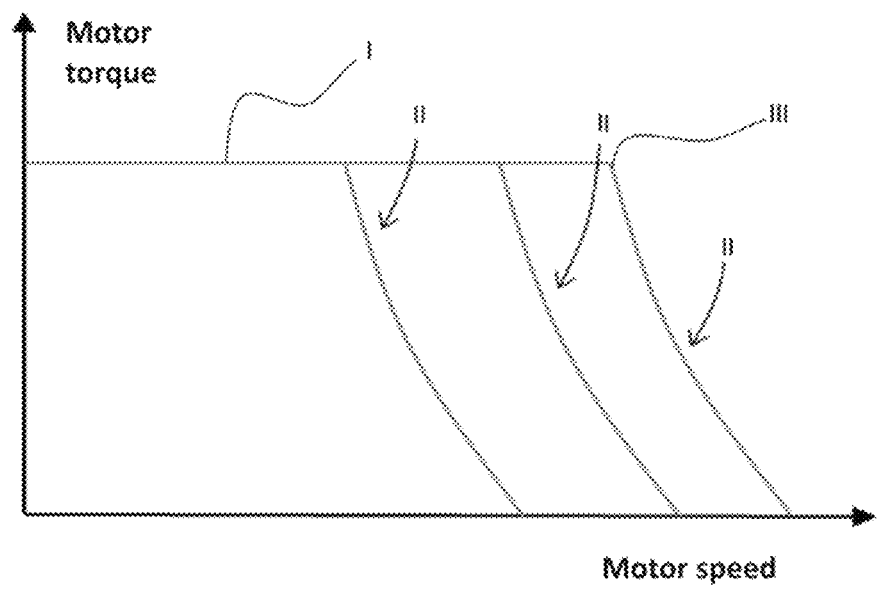
FIG. 1 is a representation of a torque-speed plane of an electric motor.

On the other hand, the monitoring device 1 according to the invention makes it possible to a certain extent to decorrelate the supply voltage and the speed of rotation of the electric motor 4. Thus, the supply voltage is monitored by measurements of the measuring member 11. From this measurement, it is possible to estimate a future decline. The monitoring member 12 can therefore directly optimize the speed of rotation of the electric motor 4 to avoid a sudden drop in the torque provided by this motor. More specifically, with reference to FIG. 1 which illustrates the torque-speed relationship, if the supply voltage declines, the maximum speed achievable while maintaining maximum torque also declines since it is the abscissa of the break point of the curve associated with the new supply voltage. The optimization of the effective speed of the motor by the monitoring member therefore consists in piloting this speed as a function of the measured supply voltage, so that it remains lower than the abscissa of the break point of the curve which translated to the left on the curve. In this way, the torque does not drop.

As by definition, the mechanical power of the motor is equal to the torque multiplied by the speed of rotation, it is understood that the power suddenly decreases if the torque drops.

To optimize the speed of rotation of the electric motor 4, the monitoring member 12 emits a signal (provided to the electric motor). This signal is a function of the voltage but not depend solely on the voltage.

Thus, in a particularly advantageous manner, the monitoring on the voltage operated by the monitoring device 1 according to the invention makes it possible not to drop the mechanical power delivered by the electric motor 4 in the event of a decline in the voltage provided by the battery 5, thanks to the piloting of the speed of rotation of the motor as a function of this voltage. In other words, the device 1 according to the invention makes a compromise in which it is accepted to reduce the speed little by little to avoid a sudden drop in the torque and therefore in the provided mechanical power. The monitoring method will be described below.

It is specified that according to one embodiment, the monitoring member 12 can comprise an inverter 121 connected to the electric motor 4. The inverter 121 is adapted to receive the electric supply voltage and deliver the signal provided to the electric motor 4 as a function of the electric supply voltage. Preferably, the inverter 121 varies a frequency of the signal provided to the electric motor 4. Thus, preferably, the variation of the frequency of the signal makes it possible to vary the speed of rotation of the electric motor 4 as described above.

According to one particularly advantageous arrangement, an inverter 121 is connected to each electric motor 4. The function of the inverter 121 is to transform direct electrical quantities into alternating electrical quantities (by electrical quantities is meant the voltage and the intensity). According to this arrangement, it is the variations of alternating electrical quantities provided by the inverter 121 that vary the speed of rotation and the torque of the electric motor 4. More specifically, according to this embodiment, the inverter 121 receives a direct electric supply voltage and generates an alternating signal (for example a sine or pseudo-sine wave). As mentioned above, the variation in the signal consists of a frequency modulation of the signal (that is to say a variation in the frequency of the signal).

Typically, the measuring member 11 can measure the voltage at the terminals of the battery 5. The measuring member 11 can be a voltmeter or any other equipment making it possible to measure an electric voltage.

According to one particular arrangement, the monitoring member 12 can control a pitch actuator adapted to vary a pitch of the propeller 3 as a function of the speed of the motor 4 piloted by the monitoring member 12, to maintain an optimal torque provided to the propeller 3. Thus, according to this arrangement, the monitoring device 1 can very advantageously modulate the speed of rotation and the pitch of the propeller 3 to maintain a substantially constant torque. In one particularly advantageous manner, the variation of the pitch of the propeller 3 makes it possible to maintain optimum thrust for an aircraft incorporating the monitoring device 1. In other words, the invention makes it possible to vary the speed of rotation of the electric motor (and therefore of the propeller 3) and the pitch of the propeller 3 in order to maximize the thrust delivered by the propeller 3, with an imposed supply voltage. In other words again, a variation in the pitch of the propeller makes it possible to compensate for a loss of thrust induced by the decrease in the speed of rotation. Thus, the variation of the pitch makes it possible to restore the thrust of the propeller which operates at a lower speed, because schematically the thrust of the propeller is proportional to the product of its speed of rotation by its pitch. In one preferred manner, the pitch of the propeller 3 is controlled as a function of the speed of rotation of the electric motor 4 (and therefore of the propeller 3), which is a function of the frequency of the signal delivered by the inverter 121 to the motor. It is this signal from the inverter 121 that can be used by the pitch control system to vary the pitch of the propeller 3.

As will be described below, the monitoring device 1 can be adapted to acquire voltages at the terminals of several motors 4 and compare them to select the lowest voltage.

Aircraft

According to another aspect, the invention relates to an aircraft 100 comprising one or more electric thrusters according to the invention. The aircraft 100 further comprises all the usual avionic systems including the various instruments for measuring the flight parameters.

Monitoring Method

According to another aspect, the invention relates to a method for monitoring the speed of a propeller 3 driven by at least one electric motor of an aircraft 100.

The monitoring method uses a monitoring device according to the invention.

Figure 5:
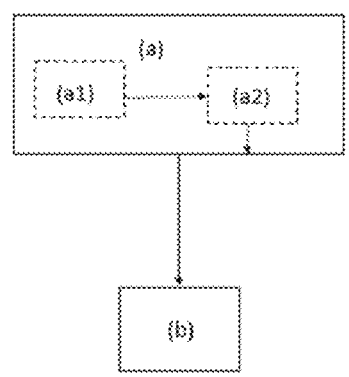
FIG. 5 is a block diagram of a method according to the invention.

The course of the monitoring method is schematized in FIG. 5.

The monitoring method comprises at least the following steps:
(a) acquiring at least one supply voltage from at least one motor 4;
(b) modifying a speed of rotation of the propeller as a function of the acquired supply voltage in order to maintain a substantially constant torque and a thrust greater than or equal to a predetermined minimum thrust.

Furthermore, step (a) can comprise the following sub-steps:
(a1) acquiring several supply voltages, each supply voltage coming from a distinct motor 4;
(a2) identifying the lowest acquired supply voltage.

In this configuration, in step (b), the acquired supply voltage used is the lowest acquired supply voltage identified in step (a2). This arrangement very advantageously makes it possible to adapt the speed of rotation of the electric motor or of all the electric motors driving the same propeller to the lowest supply voltage among all the electric motors so that they can all continue to deliver power to the propeller.

Otherwise, if some motors were maintained at their initial speed of rotation because their own supply voltage is higher, the electric motor (s) with the lowest voltage could no longer deliver power to the propeller 3.

Furthermore, if the propeller 3 has a variable pitch, step (b) can also comprise a modification of a pitch of the propeller 3 as a function of the supply voltage acquired in order to maintain a substantially constant torque and a thrust greater than or equal to a predetermined minimum thrust.

In other words, the monitoring device 1 acquires one or more supply voltages from the motor (s) (step (a) and sub-steps (a1) and (a2)). In parallel, a predetermined minimum thrust requirement is integrated into the monitoring device. This minimum thrust requirement can be determined by the aircraft 100 and transmitted to the monitoring device 1 or can be determined by the monitoring device 1 from various flight parameters.

Advantageously, the monitoring device 1 has access to tables of data recorded on the characteristics of the electric motor, in particular its torque-speed plane (cf. FIG. 1) which describes the torque domain that the motor is capable of providing as a function of its speed of rotation, and of course the measured supply voltage, to calculate the maximum acceptable speed of rotation (break point of a torque-speed curve) not to be exceeded at the risk of dropping the motor torque.

As explained above, as a function of a measured supply voltage and the characteristics of the electric motor, the monitoring device 1 can adjust the speed of rotation. Moreover, depending on the adjustment of the speed of rotation, the monitoring device 1 can adjust the pitch of the propeller 3 to compensate for the loss of thrust induced by the speed decrease. Depending on the specific characteristics of the motor, knowing the speed of rotation to be obtained, the voltage required to be provided can be determined. Thus, the monitoring device 1 will apply a voltage to the motor to maintain a constant torque and a minimum thrust.

In other words, faced with the decline of the voltage provided by a battery or any other electric supply source, the monitoring device 1 according to the invention makes it possible to monitor the voltage signal applied to the motor 4 in order to reduce the speed in a manner chosen so as to preserve the thrust and therefore the lift, so as not to risk a sudden decline of the power delivered by the motor that could occur if the motor speed were maintained unchanged.

Thus, faced with a finite electricity resource, the device according to the invention makes it possible to have an adaptive management of the electric voltage provided by the batteries and/or the other supply sources of the electric motors for the propulsion of the aircraft 100 in order to guarantee its safety.

The invention claimed is:

1. A monitoring device for monitoring an electric thruster of an aircraft, said electric thruster comprising a propeller and at least one electric motor powered by an electric supply voltage and delivering a torque and a speed of rotation to drive the propeller, wherein the monitoring device comprises at least one measuring member configured to measure the electric supply voltage, and a monitoring member configured to vary a signal provided to the at least one electric motor as a function of said measured electric supply voltage, to vary the speed of rotation of the propeller.

2. The monitoring device according to claim 1, wherein the monitoring member comprises an inverter connected to the at least one electric motor, the inverter being configured to receive the electric supply voltage and deliver the signal provided to the at least one electric motor.

3. The monitoring device according to claim 2, wherein the inverter is configured to vary a frequency of the signal provided to the at least one electric motor.

4. The monitoring device according to claim 1, wherein the monitoring member is further configured to vary a signal provided to a device for controlling a variable pitch of the propeller as a function of said measured electric supply voltage.

5. The monitoring device according to claim 1, wherein said at least one measuring member is configured to measure the electric supply voltage at terminals of at least one battery powering said at least one electric motor.

6. An electric thruster comprising a propeller driven by at least one electric motor and a monitoring device according to claim 1.

7. The electric thruster according to claim 6, comprising a plurality of electric motors having stators mounted in series on the same shaft so as to sum their torques, each stator being connected to an electric source via a dedicated inverter.

8. The electric thruster according to claim 6, comprising a plurality of electric motors mechanically connected in parallel via the same gear train so as to sum their torques, the gear train being configured so that the electric motors operate at the same speed.

9. The electric thruster according to claim 6, wherein the propeller is driven by a plurality of electric motors, each electric motor being supplied by an electric supply voltage distinct from that of another electric motor, the monitoring device comprising for each electric supply voltage a dedicated measuring member.

10. A method for monitoring the speed of a propeller driven by at least one electric motor, using a monitoring device according to claim 1, the method comprising the following steps:
   (a) measuring at least one electric supply voltage from at least one electric motor;
   (b) modifying a speed of rotation of the propeller as a function of the measured electric supply voltage in order to maintain a substantially constant torque and a thrust greater than or equal to a predetermined minimum thrust.

11. The method according to claim 10, wherein step (a) comprises the following sub-steps:
   (a1) measuring several electric supply voltages, each electric supply voltage being dedicated to a distinct electric motor;
   (a2) identifying the lowest measured electric supply voltage,
   and wherein in step (b), the measured supply voltage used is the lowest acquired supply voltage identified in step (a2).

12. The method according to claim 10, wherein step (b) further comprises a modification of a pitch of the propeller as a function of the measured electric supply voltage in order to maintain a substantially constant torque delivered by the propeller and a thrust greater than or equal to a predetermined minimum thrust.

13. An aircraft comprising a propeller driven by at least one electric motor and a monitoring device according to claim 1.

* * * * *